US012401766B2

(12) United States Patent
Saito et al.

(10) Patent No.: US 12,401,766 B2
(45) Date of Patent: Aug. 26, 2025

(54) COMMUNICATION SYSTEM, CONTROL METHOD, AND STORAGE MEDIUM

(71) Applicant: CANON KABUSHIKI KAISHA, Tokyo (JP)

(72) Inventors: Tadanori Saito, Tokyo (JP); Makoto Takahashi, Tochigi (JP); Toshiya Takahashi, Kanagawa (JP); Takayuki Kimura, Kanagawa (JP); Minoru Ohkoba, Chiba (JP); Junya Yokoyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/416,995

(22) Filed: Jan. 19, 2024

(65) Prior Publication Data
US 2024/0275923 A1 Aug. 15, 2024

(30) Foreign Application Priority Data

Feb. 14, 2023 (JP) .................................. 2023-020471

(51) Int. Cl.
*H04N 7/18* (2006.01)
*G06V 20/40* (2022.01)
(Continued)

(52) U.S. Cl.
CPC ............. *H04N 7/181* (2013.01); *G06V 20/40* (2022.01); *G06V 20/58* (2022.01); *G08G 1/056* (2013.01);
(Continued)

(58) Field of Classification Search
CPC ........ H04N 7/181; G06V 20/40; G06V 20/58; G08G 1/056; G08G 1/096741;
(Continued)

(56) References Cited

U.S. PATENT DOCUMENTS

2014/0118551 A1* 5/2014 Ikeda .................. G06T 3/047
348/148
2019/0202476 A1* 7/2019 Tao .................... B60W 30/095
(Continued)

FOREIGN PATENT DOCUMENTS

JP  2010-267052 A  11/2010
JP  2011-226972 A  11/2011

OTHER PUBLICATIONS

European Search Report dated Jul. 25, 2024, in related European Patent Application No. 24153864.4.

*Primary Examiner* — Christopher S Kelley
*Assistant Examiner* — Asmamaw G Tarko
(74) *Attorney, Agent, or Firm* — VENABLE LLP

(57) ABSTRACT

A communication system includes a first vehicle and a second vehicle, with the first vehicle configured to capture a video and recognize a foreign object on a road from the video, and can acquire an imaging location where the video is captured, an imaging direction in which the video is captured, and transmit information. The second vehicle receives the information, acquires a traveling schedule direction of the second vehicle, and displays a video. The imaging location and the imaging direction are added to the video. The first vehicle acquires a time at which the video is captured, and the second vehicle acquires a present time, and the video is displayed when an imaging time of a presently displayed video is earlier than the present time by a given time or more despite mismatch between the acquired traveling schedule direction and the received imaging direction.

7 Claims, 8 Drawing Sheets

(51) Int. Cl.
*G06V 20/58* (2022.01)
*G08G 1/056* (2006.01)
*G08G 1/16* (2006.01)

(52) U.S. Cl.
CPC ............. *G08G 1/162* (2013.01); *G08G 1/164* (2013.01); *G08G 1/165* (2013.01); *G08G 1/166* (2013.01)

(58) Field of Classification Search
CPC ....... G08G 1/096775; G08G 1/096791; G08G 1/162; G08G 1/164; G08G 1/165; G08G 1/166; G08G 1/0112
USPC .................................................. 348/148, 159
See application file for complete search history.

(56) References Cited

U.S. PATENT DOCUMENTS

| | | | |
|---|---|---|---|
| 2020/0372791 A1* | 11/2020 | Li | G06V 20/597 |
| 2022/0219686 A1* | 7/2022 | Takehara | B60W 30/0956 |
| 2022/0319318 A1* | 10/2022 | Takehara | B60W 40/04 |
| 2024/0078903 A1* | 3/2024 | Park | H04L 63/0442 |

* cited by examiner

COMMUNICATION SYSTEM, CONTROL METHOD, AND STORAGE MEDIUM

BACKGROUND OF THE INVENTION

Field of the Invention

The present invention relates to a communications system, a control method, and a storage medium.

Description of the Related Art

In the related art, there is a technique for transmitting a video captured with a camera mounted in a preceding vehicle to a following vehicle and displaying the video in the following vehicle. For example, Japanese Patent Laid-Open No. 2011-226972 discloses a technique for mounting a GPS receiver and a camera in a preceding train and displaying a traveling position and a video of the train on a monitor mounted in a following train. GPS is an abbreviation for Global Positioning System.

Incidentally, it is conceivable that a technique for providing a video captured in a preceding vehicle to a following vehicle be applied to a general automobile. In an automobile, the following vehicle can recognize and avoid a foreign object on a road by causing the preceding vehicle to transmit a video in which the foreign object on the road is imaged and causing the following vehicle to receive and display the video on a monitor in the vehicle.

In Japanese Patent Laid-Open No. 2011-226972, it is assumed that a following vehicle follows the same course as that of a preceding vehicle. However, there is not always a preceding vehicle in automobiles. Therefore, if there is no preceding vehicle, a video of a side in front in a traveling direction cannot be provided to an automobile.

In automobiles traveling on roads with traffic in both directions, an oncoming vehicle approaches from the side in front of an own vehicle. Therefore, the own vehicle can obtain an opportunity to acquire a video of the side in front in the traveling direction by receiving a video captured by the oncoming vehicle.

However, since a video obtained by a preceding vehicle imaging the side in front and a video obtained by an oncoming vehicle imaging the side in front are reversed in the traveling direction, there is a problem that it is difficult to understand the video when the video is used, for example, to recognize a foreign object on a road and it is difficult for a driver to take countermeasures. In this way, in the related art, there is room for an improvement in provision of a video of a side in front in a traveling direction of a vehicle.

SUMMARY OF THE INVENTION

According to an aspect of the present invention, a communication system includes a first vehicle and a second vehicle. The first vehicle includes an imaging unit configured to capture a video and at least one processor or circuit configured to function as: a foreign object recognition unit configured to recognize a foreign object on a road from the video, an imaging location acquisition unit configured to acquire an imaging location which is a location where the video is captured, an imaging direction acquisition unit configured to acquire an imaging direction which is a direction in which the video is captured, and a transmission unit configured to transmit information. The second vehicle includes at least one processor or circuit configured to function as: a reception unit configured to receive the information, a traveling schedule direction acquisition unit configured to acquire a traveling schedule direction of the second vehicle, and a display unit configured to display a video. The transmission unit adds an imaging location acquired by the imaging location acquisition unit and an imaging direction acquired by the imaging direction acquisition unit to a video in which the foreign object recognition unit recognizes that there is a foreign object on a road and transmits the video. The reception unit receives the video in which it is recognized that there is the foreign object, the imaging location, and the imaging direction. The display unit displays a video in which the traveling schedule direction acquired by the traveling schedule direction acquisition unit matches the received imaging direction.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Embodiment

Figure 1:
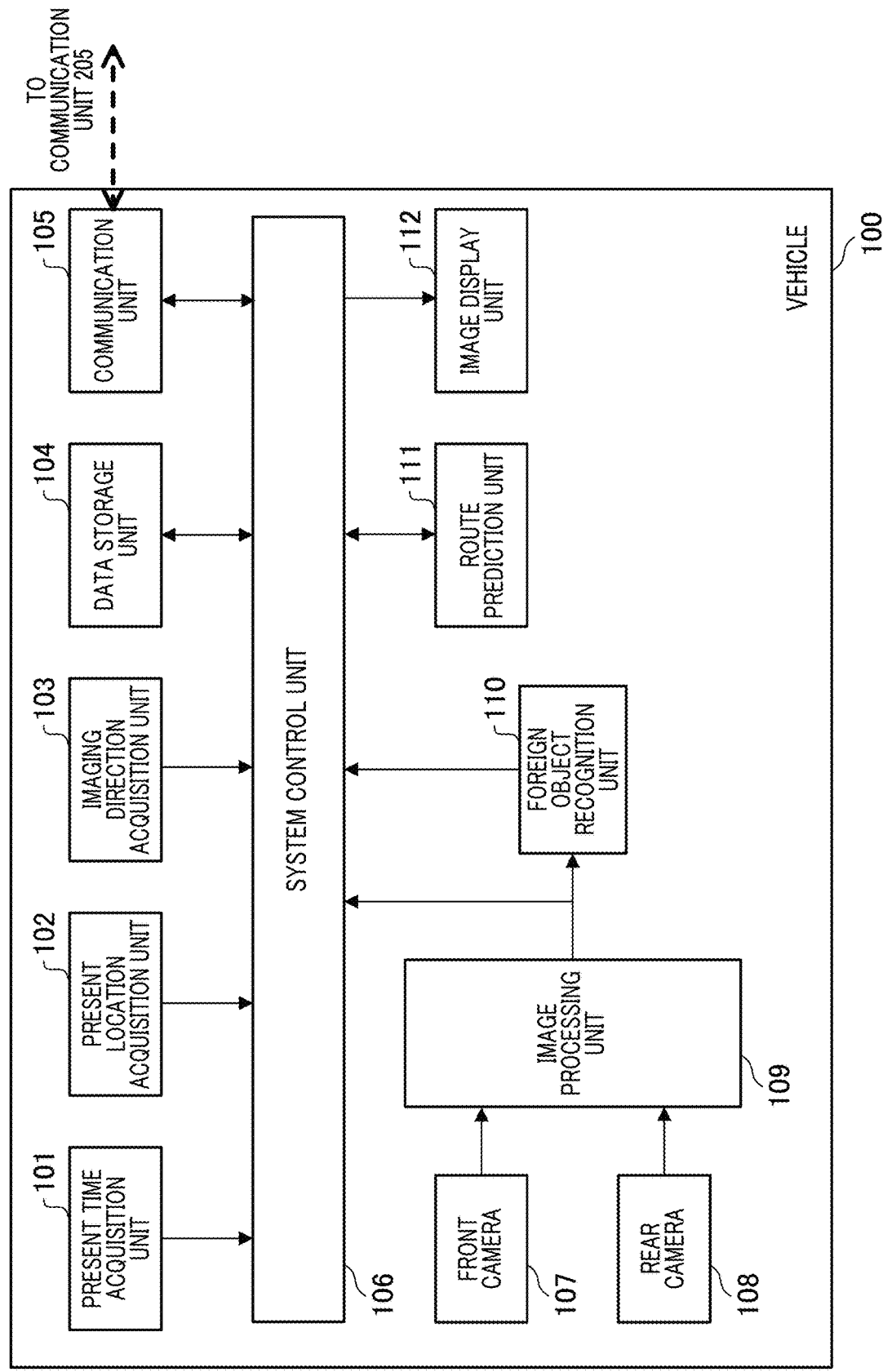
FIG. 1 is a block diagram illustrating a vehicle 100 according to an embodiment of the present invention.
Figure 2:
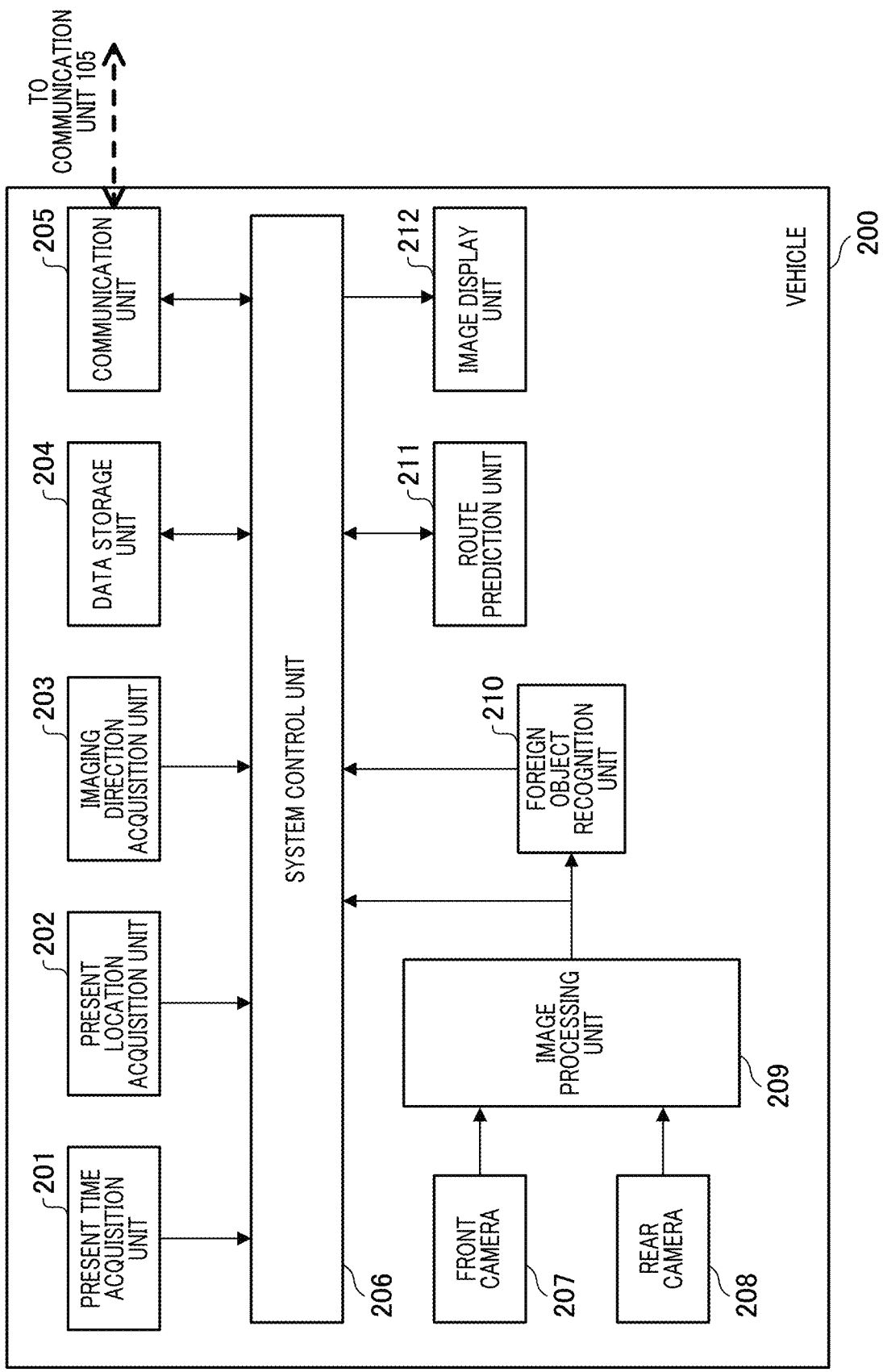
FIG. 2 is a block diagram illustrating a vehicle 200 according to an embodiment of the present invention.

FIGS. 1 and 2 are block diagrams illustrating vehicles including a communication system according to an embodiment of the present invention. FIG. 1 is a block diagram illustrating a vehicle 100 according to the embodiment of the present invention.

FIG. 2 is a block diagram illustrating a vehicle 200 according to the embodiment of the present invention. The communication system according to the present embodiment includes the vehicles 100 and 200. The vehicle 100 is an example of a first vehicle. The vehicle 200 is an example of a second vehicle.

The vehicle 100 includes a present time acquisition unit 101, a present location acquisition unit 102, an imaging direction acquisition unit 103, a data storage unit 104, a communication unit 105, and a system control unit 106. The vehicle 100 further includes a front camera 107, a rear camera 108, an image processing unit 109, a foreign object recognition unit 110, a route prediction unit 111, and an image display unit 112. The vehicle 100 further includes a driving unit (not illustrated) and can be moved by own power of the driving unit.

The present time acquisition unit 101 can acquire a present time using a scheme such as Global Navigation Satellite System (GNSS). The present location acquisition unit 102 can acquire a present location using a scheme such as GNSS.

The imaging direction acquisition unit 103 can acquire azimuth information obtained by a geomagnetic sensor mounted on a vehicle body and an imaging direction of each camera provided in the vehicle body (here, the front camera 107 and the rear camera 108)

When the geomagnetic sensor is not used, the imaging direction acquisition unit 103 may estimate a traveling direction of the vehicle 100 from a temporal change of present location information obtained from GNSS and may acquire an imaging direction of each camera from a direction of the camera provided on the vehicle body. The front camera 107 is an example of a front imaging unit that images the side in front. The rear camera 108 is an example of a rear imaging unit that images the side to the rear.

The data storage unit 104 is configured with a semiconductor memory or the like and can store acquired data. The communication unit 105 can transmit and receive data to and from another vehicle or a base station using a technique of a wireless LAN or a wireless WAN.

The system control unit 106 includes a central processing unit (CPU) that performs calculation or control, a read only memory (ROM) that is a main storage device, and a random access memory (RAM).

The system control unit 106 can receive data from the present time acquisition unit 101, the present location acquisition unit 102, the imaging direction acquisition unit 103, the image processing unit 109, and the foreign object recognition unit 110.

The system control unit 106 can exchange data with each of the data storage unit 104, the communication unit 105, and the route prediction unit 111. The system control unit 106 can transmit data to the image display unit 112.

The front camera 107 is configured with an optical lens and a sensor and can image the side in front of the vehicle 100. The rear camera 108 is configured with the same optical lens and sensor as those of the front camera 107 and can image the side to the rear of the vehicle 100.

An imaging direction of the front camera 107 matches a traveling direction when the vehicle 100 moves forward. An imaging direction of the rear camera 108 matches a traveling direction when the vehicle 100 moves backward. The imaging direction of the front camera 107 and the imaging direction of the rear camera 108 are different from each other by 180°.

The image processing unit 109 performs image processing such as de-Bayer processing, distortion correction, gamma curve processing, or color space conversion on videos captured by the front camera 107 and the rear camera 108. Accordingly, the image processing unit 109 can generate (create) videos which humans can easily identify. The image processing unit 109 can transmit the generated videos to the system control unit 106 and the foreign object recognition unit 110.

The foreign object recognition unit 110 can perform a recognition process using a scheme such as a convolutional neural network (CNN) on the received video and can estimate a road region in the video by recognizing white lines or curbstones. The foreign object recognition unit 110 can detect a foreign object such as a fallen object, a depressed hole, or earth and sand on a road by further searching the road region.

The route prediction unit 111 can predict a route along which the vehicle 100 will travel from map information stored in the data storage unit 104, preset location information which can be acquired from the present location acquisition unit 102, destination information of a navigation system (not illustrated), and the like.

The image display unit 112 is configured with an LCD panel or the like and can notify a user of information by displaying a video.

The vehicle 200 also has a configuration similar to that of the vehicle 100. The vehicle 200 includes a present time acquisition unit 201, a present location acquisition unit 202, an imaging direction acquisition unit 203, a data storage unit 204, a communication unit 205, and a system control unit 206.

The vehicle 200 further includes a front camera 207, a rear camera 208, an image processing unit 209, a foreign object recognition unit 210, a route prediction unit 211, and an image display unit 212. The vehicle 200 further includes a driving unit (not illustrated) and can be moved by own power of the driving unit.

Since an operation of each configuration of the vehicle 200 illustrated in FIG. 2 is similar to that of each configuration of the vehicle 100 illustrated in FIG. 1, detailed description thereof will be omitted. The vehicles 100 and 200 can perform authentication using the communication units 105 and 205, respectively, establish communication, and transmit and receive data.

Here, in description, it is assumed that the vehicle 100 is a transmission side and the vehicle 200 is a reception side, but both the vehicles 100 and 200 have both configurations of the transmission side and the reception side. However, the present system may have a vehicle with only a configuration of the transmission side or a vehicle with only a configuration of the reception side.

Figure 3A:
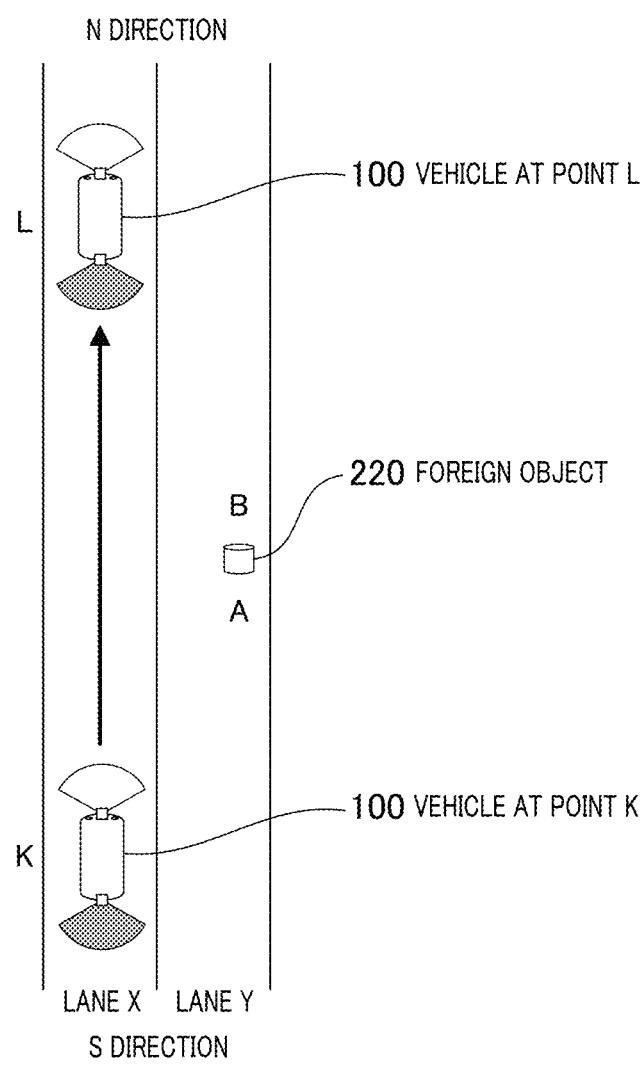
FIGS. 3A and 3B are diagrams illustrating a positional relation between the vehicle 100 and a foreign object 220.
Figure 3B:
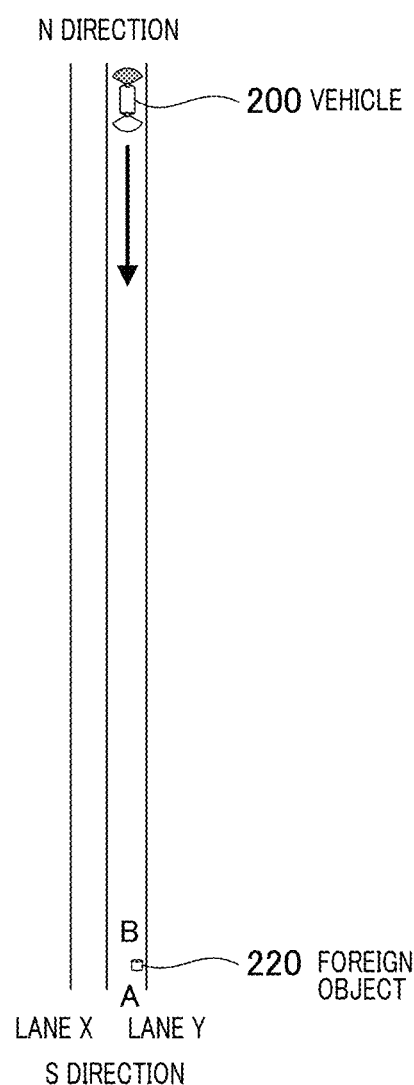

FIGS. 3A and 3B are diagrams illustrating a positional relation between the vehicle 100 and a foreign object 220. FIG. 3A illustrates a situation in which the vehicle 100 is moving from a point K to a point L. In FIGS. 3A and 3B, three vertical lanes indicate roads.

It is assumed that the left side is a lane X, the right side is a line Y, the upper side is an N direction, and the lower side is an S direction. It is assumed that a traveling direction of a vehicle in the lane X is the N direction and a traveling direction of a vehicle in the lane Y is the S direction. It is assumed that the foreign object 220 is on the lane Y, a surface of the object 220 in the S direction is an A surface and a surface of the object 220 in the N direction is a B surface.

In FIGS. 3A and 3B, fan-shaped portions illustrated above and below the vehicles 100 and 200 indicate imaging range angles of the front camera 207 and the rear camera 208. A portion indicated with white in the fan-shaped portions indicates an imaging range angle of the front camera 107 and a portion indicated with gray in the fan-shaped portions indicates an imaging range angle of the rear camera 108.

As illustrated in FIG. 3A, the vehicle 100 is traveling in the lane X from the S direction to the N direction. The lane Y is an opposite lane of the lane X. The foreign object 220 is on the lane Y between the points K and L.

FIG. 3B illustrates a situation in which the vehicle 200 is traveling in the lane Y from the N direction to the S direction. The vehicle 200 is located in the N direction from the point L at a time point at which the vehicle 100 reaches the point L. It is assumed that the vehicle 200 is distant from the foreign object 220 and the vehicle 200 cannot directly check the object 220.

Figure 4:
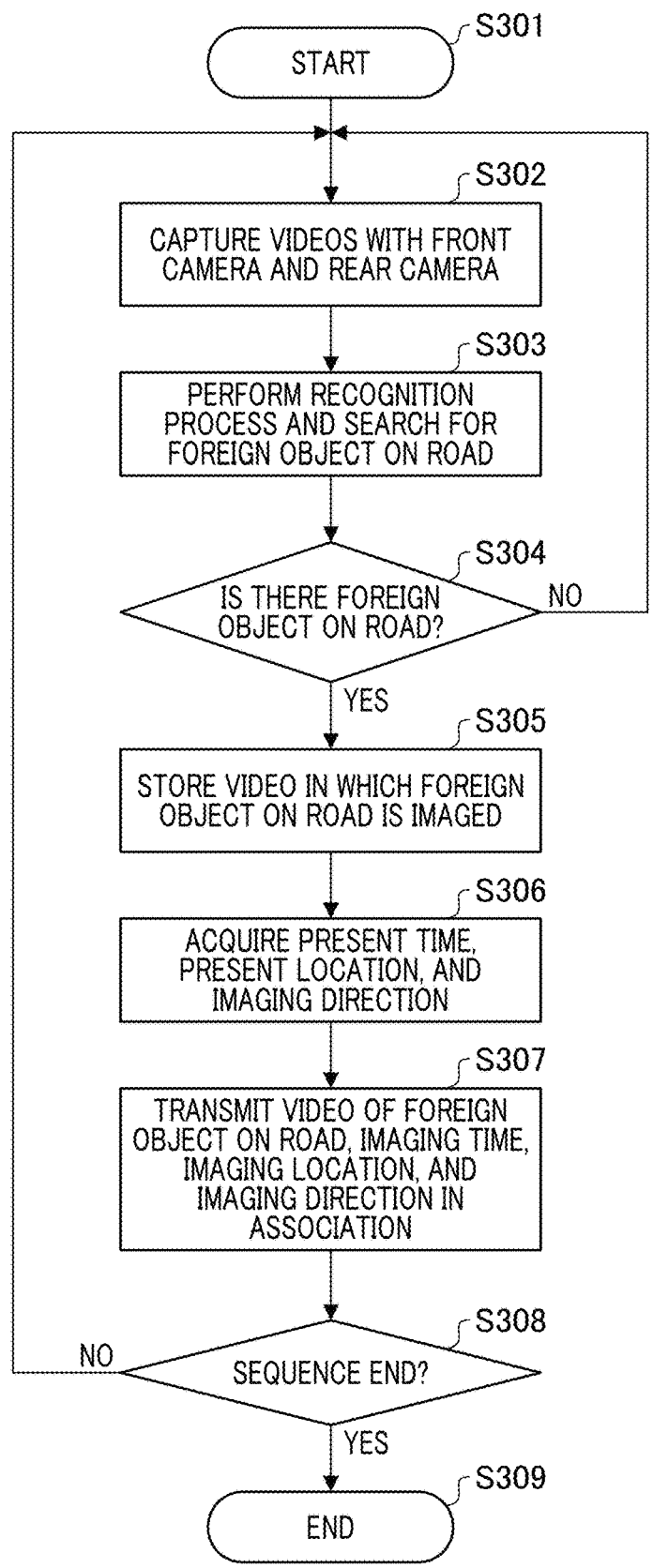
FIG. 4 is a flowchart illustrating an operation of the vehicle 100 which is a transmission side.
Figure 5:
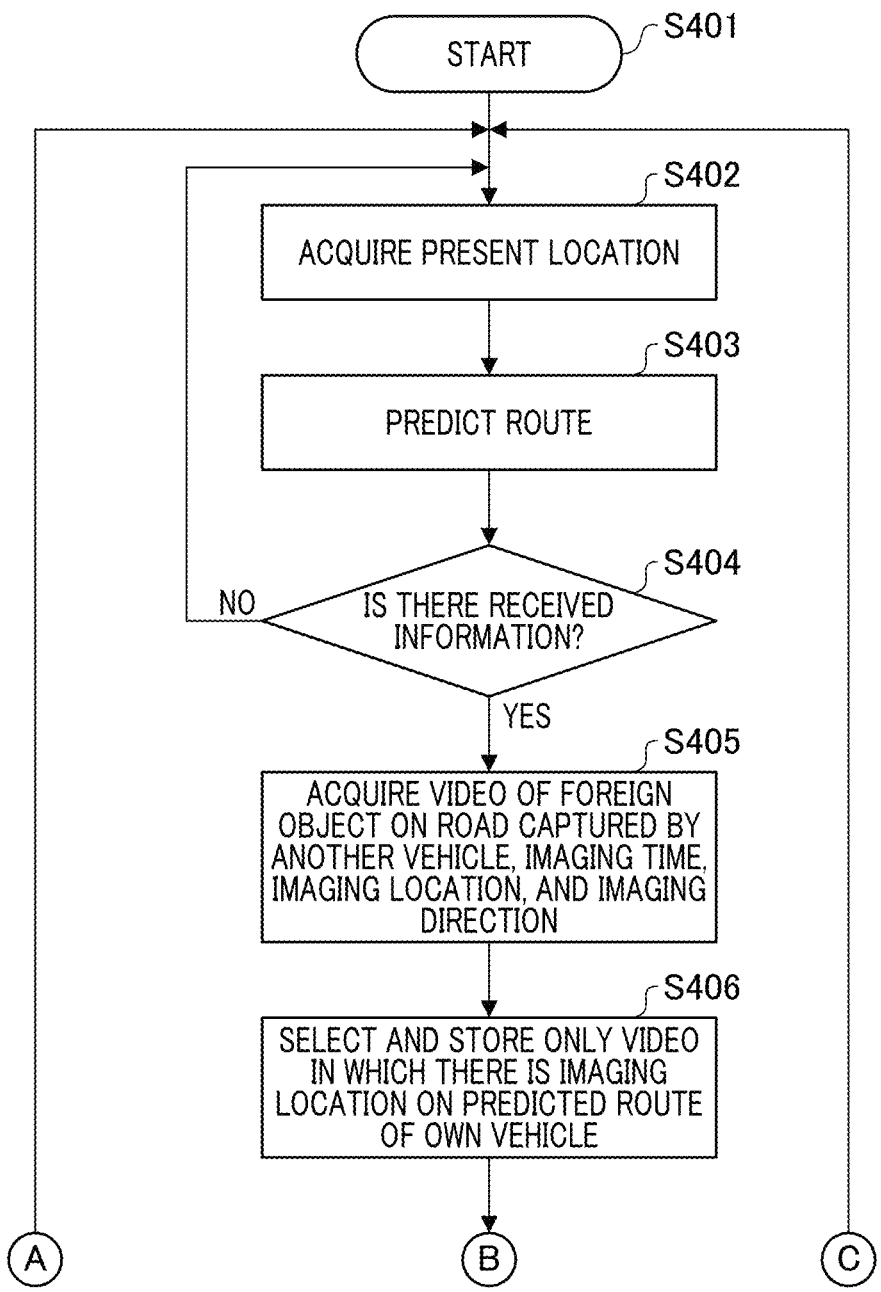
FIG. 5 is a flowchart illustrating an operation of the vehicle 200 which is a reception side.
Figure 6:
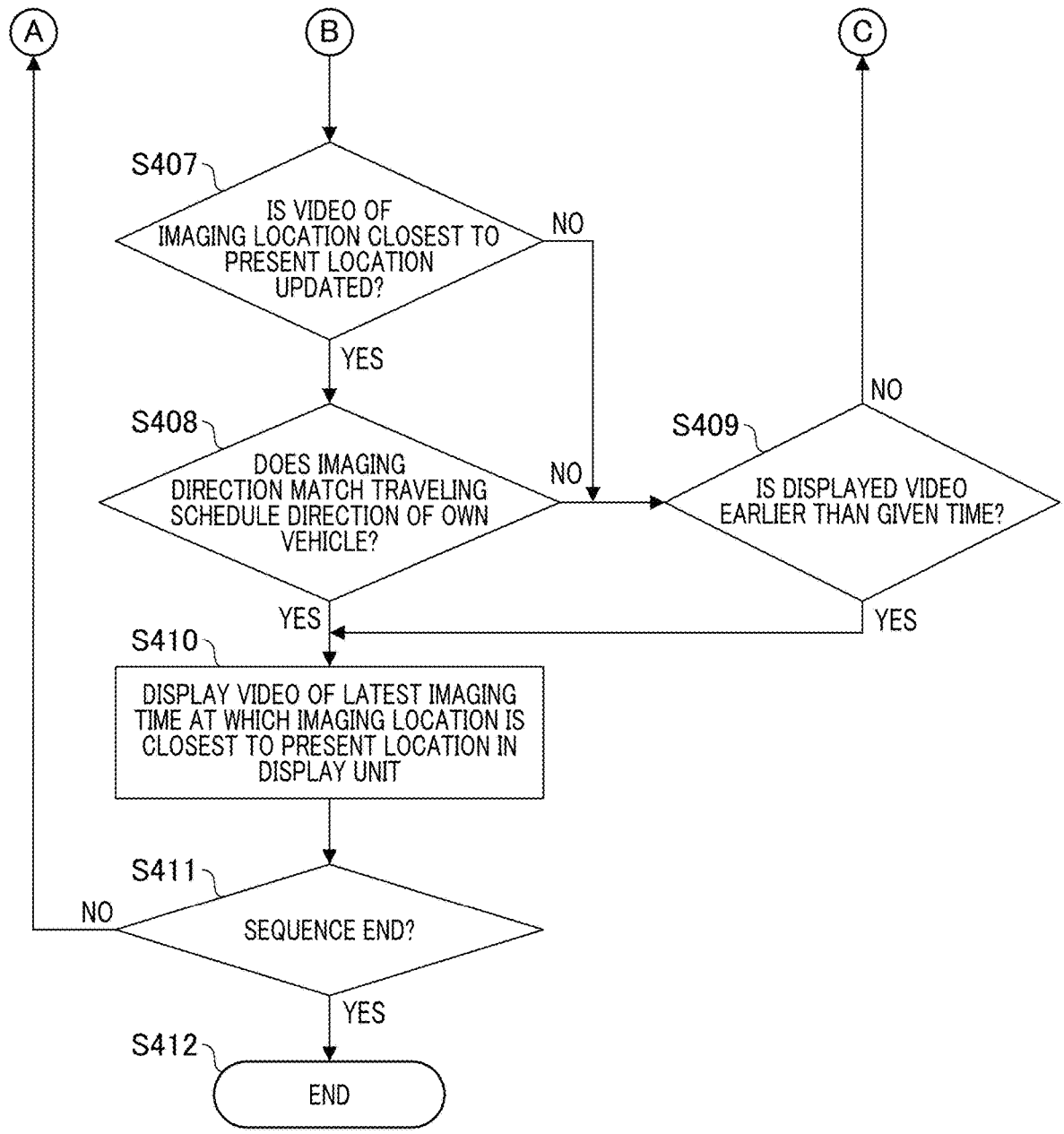
FIG. 6 is a flowchart illustrating an operation of the vehicle 200 which is the reception side and a diagram continuous from FIG. 5.

FIG. 4 is a flowchart illustrating an operation of the vehicle 100 which is a transmission side. FIG. 5 is a flowchart illustrating an operation of the vehicle 200 which is a reception side. FIG. 6 is a flowchart illustrating an operation of the vehicle 200 which is the reception side and a diagram continuous from FIG. 5.

First, an operation of the vehicle 100 will be described in detail with reference to the flowchart of FIG. 4. In step S301, the vehicle 100 starts a process. In step S302, the front camera 107 and the rear camera 108 image the front and rear of the vehicle 100, respectively, and transmit videos to the image processing unit 109.

In step S303, the image processing unit 109 performs image processing such as de-Bayer processing, distortion correction, gamma curve processing, or color space conversion on the received videos of the front camera 107 and the rear camera 108. In step S303, the image processing unit 109 outputs the generated videos to the system control unit 106 and the foreign object recognition unit 110.

In step S304, the foreign object recognition unit 110 performs a recognition process on the received videos, searches for a foreign object on the road, and determines whether there is a foreign object. When the foreign object recognition unit 110 determines that there is the foreign object, the process of step S305 is performed. When the foreign object recognition unit 110 determines that there is no foreign object, the process returns to step S302 and continues.

In step S305, the system control unit 106 selects a video in which the foreign object is imaged among the videos received from the image processing unit 109 and temporarily stores the video in the data storage unit 104 when the foreign object recognition unit 110 notifies the system control unit 106 that there is the foreign object.

In step S306, the system control unit 106 acquires a present time from the present time acquisition unit 101, acquires a present location from the present location acquisition unit 102, and acquires an imaging direction from the imaging direction acquisition unit 103.

In step S307, the system control unit 106 adds various types of information in association to the video in which the foreign object on the road is imaged and which is stored in the data storage unit 104. Examples of the various types of information added in association to the video in which the foreign object is imaged include information in which the present time acquired in step S306 is set as the imaging time.

The present time acquisition unit 101 is an example of an imaging time acquisition unit. Examples of the various types of information added in association to the video in which the foreign object is imaged include information in which the present location acquired in step S306 is an imaging location.

The present location acquisition unit 102 is an example of an imaging location acquisition unit. Examples of the various types of information added in association to the video in which the foreign object is imaged include information regarding the imaging direction acquired in step S306.

Thereafter, in step S307, the system control unit 106 uses the communication unit 105 to transmit, to the outside, a data set of the video of the foreign object on the road, the imaging time, the imaging location, and the imaging direction which are associated.

Here, the outside is a vehicle in the periphery of the present location. The vehicle 100 notifies the vehicle in the periphery of information regarding the foreign object on the road by transmitting the information using a broadcast scheme through inter-vehicle communication.

In step S308, the system control unit 106 determines whether a sequence end is notified of by a control signal from the outside (not illustrated). When the system control unit 106 determines that the sequence end is notified of, the process of step S309 is performed.

When the system control unit 106 determines that the sequence end is not notified of, the process returns to step S302 and continues. In step S309, the system control unit 106 ends the process.

Figure 7A:
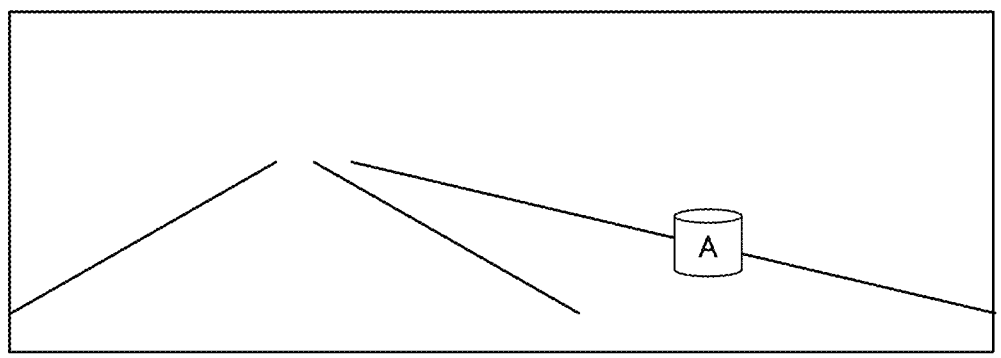
FIG. 7A is a diagram illustrating a video of a front camera 107 of the vehicle 100 at a point K and FIG. 7B is a diagram illustrating a video of a rear camera 108 of the vehicle 100 at a point L.

The flowchart illustrated in FIG. 4 has been described above. Here, it is considered that the operation of the flowchart of FIG. 4 is applied to the vehicle 100 in FIG. 3A. When the vehicle 100 reaches the point K, the vehicle 100 traveling in the lane X from the S direction to the N direction can image the A surface of the foreign object 220 with the front camera 107 and detect the foreign object on the road. FIG. 7A illustrates a video captured by the front camera 107 when the vehicle 100 reaches the point K.

In the video captured with the front camera 107, as illustrated in FIG. 7A, the foreign object is on the right lane of the road and the A surface of the foreign object is imaged. In FIG. 7A, the left lane is the lane X and the right lane is the lane Y.

In FIG. 7A, to easily understand that the A surface of the foreign object is imaged, "A" is written on the foreign object. In the video of FIG. 7A, it is assumed that TK is an imaging time, PK is an imaging location, and DK is an imaging direction. The vehicle 100 transmits a data set of the video of FIG. 7A, the imaging time TK, the imaging location PK, and the imaging direction DK in association with each other.

Figure 7B:
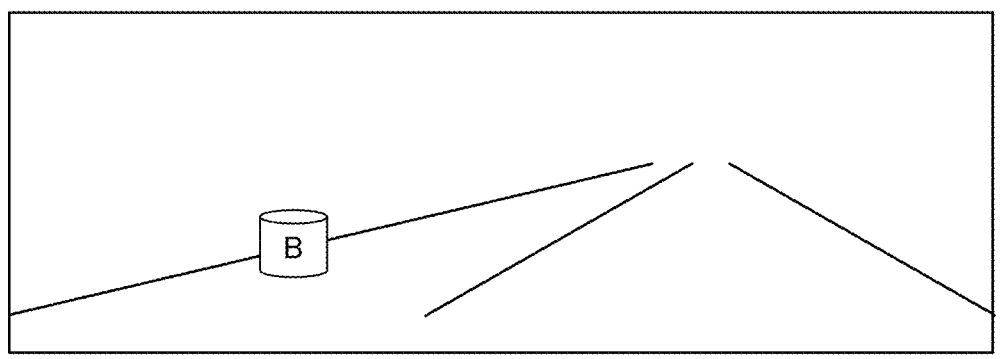

When the vehicle 100 reaches the point L, the vehicle 100 can image the B surface of the foreign object 220 with the rear camera 108 and detect the foreign object on the road. FIG. 7B illustrates a video captured with the rear camera 108 when the vehicle 100 reaches the point K.

In the video captured with the rear camera 108, as illustrated in FIG. 7B, a foreign object is on the left lane of the road and the B surface of the foreign object is imaged. In FIG. 7B, the left lane is the lane X and the right lane is the lane Y.

In FIG. 7B, to easily understand that the B surface of the foreign object is imaged, "B" is written on the foreign object. In the video of FIG. 7B, it is assumed that TL is an imaging time, PL is an imaging location, and DL is an imaging direction. The vehicle 100 transmits a data set of the video of FIG. 7B, the imaging time TL, the imaging location PL, and the imaging direction DL in association with each other.

The imaging direction DK is the N direction and the imaging direction DI is the S direction. The imaging directions DK and DL are directions different from each other by 180°. It can be estimated that the same foreign object 220 is imaged in the video of FIG. 7A and the video of FIG. 7B from the traveling direction calculated from a temporal change of the present location of the vehicle 100 and the imaging direction of each off of the front camera 107 and the rear camera 108.

Therefore, the imaging locations PK and PL are positions of the points K and L. In the present embodiment, the imaging locations PK and PL may be treated as the same location.

Next, an operation of the vehicle 200 will be described in detail with reference to the flowcharts of FIGS. 5 and 6. In step S401, the vehicle 200 starts a process. In step S402, the system control unit 206 acquires a present location from the present location acquisition unit 202.

In step S403, the system control unit 206 transmits the acquired present location to the route prediction unit 211. In step S403, the route prediction unit 211 generates a route along which the vehicle 200 is predicted to travel from a history of the received present location, map information stored in the data storage unit 204, destination information set in a navigation system (not illustrated), and the like.

In step S403, the route prediction unit 211 transmits the generated predicted route to the system control unit 206.

In step S404, the system control unit 206 determines whether there is received information in the communication unit 205. When the system control unit 206 determines that there is no received information, the process of step S402 is performed. When the system control unit 206 determines that there is the received information, the process of step S405 is performed.

In step S405, the system control unit 206 receives a data set of the video of the foreign object on the road captured by another vehicle, the imaging time, the imaging location, and the imaging direction using the communication unit 205. In step S406, the system control unit 206 selects a video in which there is the imaging location on the predicted route of the vehicle 200 from the received information and stores the data set of the video, the imaging time, the imaging location, and the imaging direction in association in the data storage unit 204.

In step S407, the system control unit 206 determines whether a video of an imaging location closest to the present location is updated from information regarding the present location acquired in step S402 and the imaging time and the imaging location of the data set stored in step S406.

When the system control unit 206 determines that the video is not updated, the process of step S409 is performed. When the system control unit 206 determines that the video is updated, the process of step S408 is performed.

In step S408, the system control unit 206 acquires the imaging location in the data set associated with the video determined to be updated in step S407 and estimates a traveling schedule direction at the acquired imaging location from the predicted route generated in step S403.

This process is an example of the traveling schedule direction acquisition unit. In step S408, the system control unit 206 acquires the imaging direction of the data set associated with the video determined to be updated in step S407 and compares the acquired imaging direction with the traveling schedule direction estimated in step S408.

When the system control unit 206 determines that the imaging direction matches the traveling schedule direction, the process of step S410 is performed. When the system control unit 206 determines that the imaging direction does not match the traveling schedule direction, the process of step S409 is performed.

In step S409, the system control unit 206 checks the imaging time of the video displayed in the image display unit 212, compares the imaging time with the present time acquired from the present time acquisition unit 201, and determines whether the imaging time of the presently displayed video is earlier than a given time.

When the system control unit 206 determines that the imaging time of the presently displayed video is not earlier than the given time, the process of step S402 is performed. When the system control unit 206 determines that the imaging time of the presently displayed video is earlier than the given time, the process of step S410 is performed.

In step S410, the system control unit 206 selects a video of a latest imaging time at which the imaging location is closest to the present location from the data set stored in step S406 and displays the video in the image display unit 212.

In step S411, the system control unit 206 determines whether a sequence end is notified of by a control signal from the outside (not illustrated). When the system control unit 206 determines that the sequence end is notified of, the process proceeds to step S411 and ends. When the system control unit 206 determines that the sequence end is not notified of, the process of step S402 is performed.

The operation of the vehicle 200 has been described above with reference to the flowcharts of FIGS. 5 and 6. In step S408, whether the imaging direction matches the traveling schedule direction is determined as a condition. However, when the imaging direction and the traveling schedule direction are equal to or less than a given angle (for example, 30°), it may be determined that the imaging direction matches the traveling schedule direction. The image display unit 212 may reverse and display the video when the imaging direction does not match the traveling schedule direction.

Here, it is considered that the operation of the flowcharts described in FIGS. 5 and 6 is applied to the vehicle 200 that has the positional relation illustrated in FIG. 3B. The vehicle 200 is traveling from the N direction to the S direction and is distant from the foreign object 220.

As described above, in FIG. 3A, the vehicle 100 transmits a data set of the video of FIG. 7A, the imaging time TK, the imaging location PK, and the imaging direction DK at the point K when the vehicle 100 is traveling near the foreign object 220.

The vehicle 100 transmits the data set of the video of FIG. 7B, the imaging time TL, the imaging location PL, and the imaging direction DL at the point L. Here, a case in which a video of a foreign object that is located at a position more away than a distance between the vehicle 200 and the foreign object 220 and is located on a road earlier than a given time (for example, 30 seconds) is displayed in the image display unit 212 of the vehicle 200 will be considered.

After the vehicle 100 reaches the point K, the vehicle 100 transmits a data set of the video of FIG. 7A, the imaging time TK, the imaging location PK, and the imaging direction DK and the vehicle 200 receive the data set. The vehicle 200 receives the data set and updates the video of the closest imaging location. Since the presently displayed video is a video earlier than the given time despite mismatch between the imaging direction and the traveling direction of the own vehicle, the display on the image display unit 212 is updated to the video of FIG. 7A.

Subsequently, after the vehicle 100 reaches the point L, the vehicle 100 transmits a data set of the video of FIG. 7B, the imaging time TL, the imaging location PL, and the imaging direction DL, and the vehicle 200 receives the data set. The vehicle 200 receives the data set and updates the video of the closest imaging location because of the match between the imaging direction and the traveling direction of the own vehicle, the display on the image display unit 212 is updated to the video of FIG. 7B.

The vehicle 200 is a vehicle that travels in the vehicle Y from the N direction to the S direction. Therefore, an ideal video of the foreign object 220 on the road for a driver of the vehicle 200 is a video obtained by imaging the B surface of the foreign object 220 by the vehicle traveling in the lane Y from the N direction to the S direction, as illustrated in FIG.

8. However, when there is no preceding vehicle of the vehicle 200, the video of FIG. 8 cannot be captured.

Figure 8:
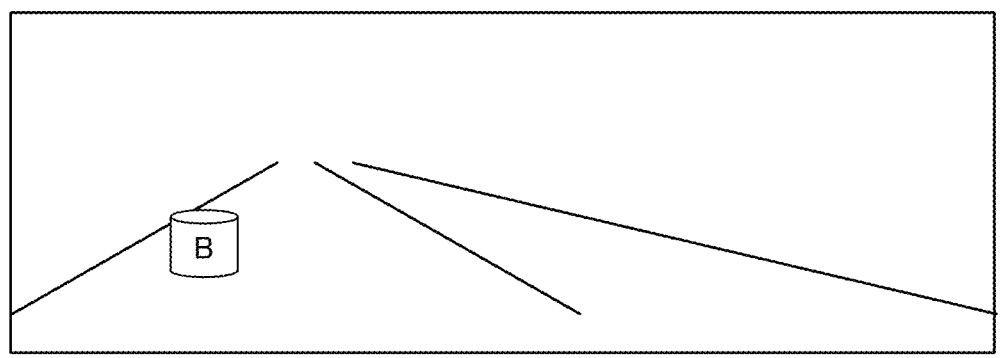
FIG. 8 is a diagram illustrating a video which can be acquired by a preceding vehicle of the vehicle 200.

When the video of FIG. 7B is compared with the video of FIG. 8, the foreign object 220 is located on the left of the screen and the B surface is imaged in both videos. Therefore, FIG. 7B is a video sufficiently useful for a driver. When the present embodiment is not applied, only the video of FIG. 7A is provided from the vehicle 100 which is an oncoming vehicle of the vehicle 200.

The video of FIG. 7A has right and left reversed disposition of the foreign object 220 and an opposite imaging surface, compared with the video of FIG. 8. Therefore, it is difficult for the driver to correctly recognize the foreign object 220.

When there is no preceding vehicle and an oncoming vehicle has only a front camera, a video displayed in the image display unit 212 is not updated.

When the display on the image display unit 212 remains to be the same video for a given time or more, it may be considered that there is a change in the position or state of the foreign object on the road. Therefore, even when an image with a different direction of travel and the imaging direction of the vehicle 200 is provided, the video display of the image display unit 212 may be updated.

When FIG. 7B is compared with FIG. 8, it can be understood that a vanishing point of the road is right and left reversed because of a different traveling lane. To solve this problem, for example, image processing may be performed to obtain an image of FIG. 9 by setting the vanishing point of the video of FIG. 7B near a center.

Figure 9:
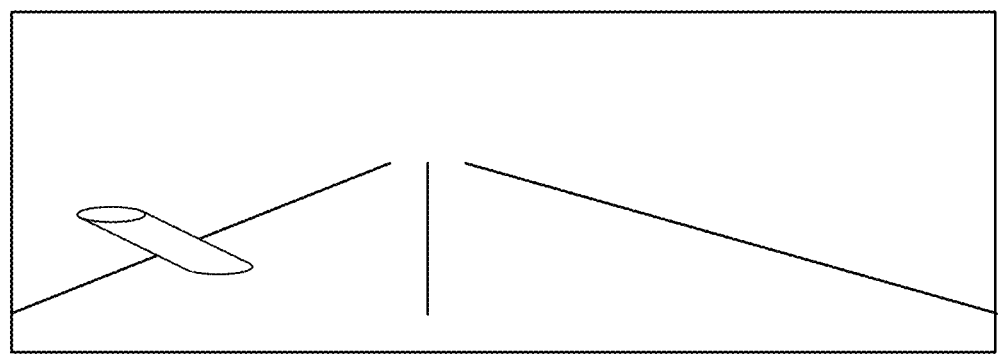
FIG. 9 is a diagram illustrating a video obtained by performing image processing on the video of FIG. 7B.

In the image of FIG. 9, a process of shifting a horizontal line to the left so that the center line of the road extends in the vertical direction, and thus a movement amount to the left is set to increase when the vehicle moves from the bottom to the top. The image processing enables a driver to less feel a sense of discomfort caused due to a video captured from a different lane. However, in the image processing, as illustrated in FIG. 9, distortion occurs in the video of the foreign object.

In the present embodiment, the vehicle 100 transmits information in conformity with a broadcast scheme, but is considered that broadcasting is stopped at a time point at which a present location is away from an imaging location by a given distance or more.

Here, a period in which broadcasting continues may be changed depending on a traveling road or a situation. In the case of an imaging location such as a highway where a speed limit is high, the period in which broadcasting continues may be shortened. In the case of a residential street or the like where a speed limit is low, the period may be lengthened.

When it is determined that a large foreign object on a road interferes with traffic, the period in which broadcasting continues may be lengthened. When the foreign object is small, the period may be shortened. When a foreign object is on an oncoming lane, broadcasting may continue to inform many oncoming vehicles of presence of the foreign object for a period longer than in a case where a foreign object is on a traveling lane of the own vehicle.

In the present embodiment, it is assumed that vehicles directly communicate with each other through inter-vehicle communication. The present invention can also be applied even when vehicles communicate with each other via a server.

As described above, according to the present embodiment, when a foreign object on a road is displayed, a video in which an imaging surface of the foreign object is the same in a direction in which right and left dispositions of the foreign object are the same can also be displayed in a video from an oncoming vehicle.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the communication system or the like through a network or various storage media. Then, a computer (or a CPU, an MPU, or the like) of the communication system or the like may be configured to read and execute the program. In such a case, the program and the storage medium storing the program configure the present invention.

The present invention includes inventions implemented using, for example, at least one processor or circuit configured to have functions of the embodiments explained above. A plurality of processors may be used to perform a distribution process.

This application claims the benefit of Japanese Patent Application No. 2023-020471, filed on Feb. 14, 2023, which is hereby incorporated by reference herein in its entirety.

What is claimed is:

1. A communication system comprising:
   a first vehicle; and
   a second vehicle,
   wherein the first vehicle includes
   an imaging unit configured to capture a video; and
   at least one processor or circuit configured to function as:
      a foreign object recognition unit configured to recognize a foreign object on a road from the video,
      an imaging location acquisition unit configured to acquire an imaging location which is a location where the video is captured,
      an imaging direction acquisition unit configured to acquire an imaging direction which is a direction in which the video is captured, and
      a transmission unit configured to transmit information,
   wherein the second vehicle includes
   at least one processor or circuit configured to function as:
      a reception unit configured to receive the information,
      a traveling schedule direction acquisition unit configured to acquire a traveling schedule direction of the second vehicle, and
      a display unit configured to display a video,
   wherein the transmission unit adds an imaging location acquired by the imaging location acquisition unit and an imaging direction acquired by the imaging direction acquisition unit to a video in which the foreign object recognition unit recognizes that there is a foreign object on a road and transmits the video,
   wherein the reception unit receives the video in which it is recognized that there is the foreign object, the imaging location, and the imaging direction,
   wherein the display unit displays a video in which the traveling schedule direction acquired by the traveling schedule direction acquisition unit matches the received imaging direction,
   wherein the at least one processor or circuit in the first vehicle is further configured to function as an imaging time acquisition unit configured to acquire an imaging time which is a time at which the video is captured, wherein the transmission unit adds the imaging time acquired by the imaging time acquisition unit to a video in which the foreign object recognition unit recognizes that there is a foreign object on a road and transmits the video, wherein the at least one processor or circuit in the second vehicle is further configured to function as a present time acquisition unit configured to acquire a present time, wherein the reception unit receives the video in which it is recognized that there is a foreign object, the imaging location, the imaging direction, and the imaging time, and wherein the display unit displays the received video when an imaging time of a presently displayed video is earlier than the present time by a given time or more despite a mismatch between the traveling schedule direction acquired by the traveling schedule direction acquisition unit and the received imaging direction.

2. The communication system according to claim 1, wherein the imaging unit includes a front imaging unit that images a front side and a rear imaging unit that images a rear side.

3. The communication system according to claim 1,
wherein the at least one processor or circuit in the second vehicle is further configured to function as a present location acquisition unit configured to acquire a present location of the second vehicle, wherein the display unit displays a video in which the imaging location is closest to the present location acquired by the present location acquisition unit.

4. A communication system comprising:
a first vehicle; and
a second vehicle,
wherein the first vehicle includes
an imaging unit configured to capture a video; and
at least one processor or circuit configured to function as:
a foreign object recognition unit configured to recognize a foreign object on a road from the video,
an imaging location acquisition unit configured to acquire an imaging location which is a location where the video is captured,
an imaging direction acquisition unit configured to acquire an imaging direction which is a direction in which the video is captured, and
a transmission unit configured to transmit information,
wherein the second vehicle includes
at least one processor or circuit configured to function as:
a reception unit configured to receive the information,
a traveling schedule direction acquisition unit configured to acquire a traveling schedule direction of the second vehicle, and
a display unit configured to display a video,
wherein the transmission unit adds an imaging location acquired by the imaging location acquisition unit and an imaging direction acquired by the imaging direction acquisition unit to a video in which the foreign object recognition unit recognizes that there is a foreign object on a road and transmits the video, wherein the reception unit receives the video in which it is recognized that there is the foreign object, the imaging location, and the imaging direction, wherein the display unit displays a video in which the traveling schedule direction acquired by the traveling schedule direction acquisition unit matches the received imaging direction, and wherein the display unit reverses and displays the video in a case of a mismatch between the traveling schedule direction acquired by the traveling schedule direction acquisition unit and the received imaging direction.

5. The communication system according to claim 4, wherein the imaging unit includes a front imaging unit that images a front side and a rear imaging unit that images a rear side.

6. The communication system according to claim 4,
wherein the at least one processor or circuit in the second vehicle is further configured to function as a present location acquisition unit configured to acquire a present location of the second vehicle, wherein the display unit displays a video in which the imaging location is closest to the present location acquired by the present location acquisition unit.

7. A method of controlling a communication system including first and second vehicles,
wherein the first vehicle captures a video, recognizes a foreign object on a road from the video, acquires an imaging location which is a location where the video is captured, acquires an imaging direction which is a direction in which the video is captured, and transmits information, wherein the second vehicle receives the information, acquires a traveling schedule direction of the second vehicle, and displays a video, the method comprising:
adding, in the transmitting, an imaging location acquired in the acquiring of the imaging location and an imaging direction acquired in the acquiring of the imaging direction are to a video in which it is recognized that there is a foreign object on a road in the recognizing of the foreign object;
transmitting the video;
receiving, in the video in which it is recognized that there is a foreign object, the imaging location and the imaging direction;
displaying a video in which the traveling schedule direction acquired in the acquiring of the traveling schedule direction matches the received imaging direction; and
reversing and displaying the video in a case of a mismatch between the acquired traveling schedule direction and the received imaging direction.

* * * * *